(12) United States Patent
Scott et al.

(10) Patent No.: US 11,186,881 B2
(45) Date of Patent: Nov. 30, 2021

(54) METHOD AND APPARATUS FOR MANUFACTURE OF DRY POWDERS

(71) Applicant: BIOMASS TECHNOLOGIES PTY LTD, Balmain (AU)

(72) Inventors: Maxwell Scott, Balmain (AU); Rodney Brown, Balmain (AU)

(73) Assignee: BIOMASS TECHNOLOGIES PTY LTD, Balmain (AU)

(*) Notice: Subject to any disclaimer, the term of this patent is extended or adjusted under 35 U.S.C. 154(b) by 0 days.

(21) Appl. No.: 16/970,503

(22) PCT Filed: May 10, 2018

(86) PCT No.: PCT/AU2018/050436
§ 371 (c)(1),
(2) Date: Aug. 17, 2020

(87) PCT Pub. No.: WO2019/213685
PCT Pub. Date: Nov. 14, 2019

(65) Prior Publication Data
US 2021/0077965 A1 Mar. 18, 2021

(51) Int. Cl.
*C13B 40/00* (2011.01)
*B01J 2/04* (2006.01)
(Continued)

(52) U.S. Cl.
CPC ............... *C13B 40/00* (2013.01); *B01D 1/18* (2013.01); *B01D 19/0005* (2013.01); *B01J 2/04* (2013.01); *B01J 2/20* (2013.01)

(58) Field of Classification Search
CPC ...... C13B 40/00; B01D 1/18; B01D 19/0005; B01J 2/04
See application file for complete search history.

(56) References Cited

U.S. PATENT DOCUMENTS 3,185,580 A 5/1965 Hanrahan et al.
3,320,074 A 5/1967 Gebhardt
(Continued)

FOREIGN PATENT DOCUMENTS

WO 2017/093302 6/2017
WO WO-2017093302 A1 * 6/2017 ............... A23G 1/40

OTHER PUBLICATIONS

Moona Mohammadi et al, "Simulationf of Spray Dryer with Cooling Air Jacket by Computational Fluid Dynamics", Proceedings of the 2nd International Conference on Thermal Engineering Theory and Applications Jan. 3-6, 2006, Al Ain, United Arab Emirates (Year: 2006).*

(Continued)

*Primary Examiner* — David M Brunsman
(74) *Attorney, Agent, or Firm* — Lowenstein Sandler LLP

(57) ABSTRACT

A method of production of a homogeneous powdered product from a starting product in a liquid state, the starting product having sugars as at least 60% of its total solids, the method comprising: in the absence of air; pressurizing the starting product to a pressure greater than 1 bar; injecting a gas into the starting product to form a mixture in which the starting product is substantially saturated by the gas; and degassing the mixture into a continuous stream of transport gas such that, on contact with the transport gas, water from the mixture evaporates to leave the homogeneous powdered product.

10

(51) Int. Cl.
  *B01D 1/18* (2006.01)
  *B01D 19/00* (2006.01)
  *B01J 2/20* (2006.01)

(56) References Cited

U.S. PATENT DOCUMENTS

| | | | | |
|---|---|---|---|---|
| 3,746,554 | A * | 7/1973 | Endicott et al. | A23L 27/33 426/548 |
| 7,279,191 | B2 * | 10/2007 | Landon | A23C 15/02 426/581 |
| 8,268,378 | B2 * | 9/2012 | Durand | A23C 9/16 426/588 |
| 9,101,897 | B2 * | 8/2015 | Buisson | A61P 25/00 |
| 2007/0212476 | A1 | 9/2007 | Destephen et al. | |
| 2009/0312281 | A1 | 12/2009 | Buisson et al. | |
| 2016/0045434 | A1 | 2/2016 | Caponetti et al. | |

OTHER PUBLICATIONS

International Search Report for PCT/AU2018/050436 dated Jul. 30, 2018, 6 pgs.

* cited by examiner

METHOD AND APPARATUS FOR MANUFACTURE OF DRY POWDERS

CROSS-REFERENCE TO RELATED APPLICATIONS

This application is a national stage entry of PCT/AU2018/050436, filed May 10, 2018, and claims priority from Australian provisional patent application number 2017901770 filed 12 May 2017, the contents of which is incorporated by reference in its entirety.

TECHNICAL FIELD

The present disclosure relates to a method and apparatus for manufacturing dry powders from high sugar concentration, low glass transition liquids.

BACKGROUND

High sugar concentration, low glass transition ($T_g$) liquids extracted from natural products, such as sugar cane, vegetables and fruits contain an abundance of vitamins and minerals including calcium, chromium, cobalt, copper, magnesium, manganese, phosphorous, potassium and zinc. Some of these extracts also contain iron and vitamins A, C, B1, B2, B3, B5 and B6 alongside a high concentration of phytonutrients, antioxidants and other health-promoting compounds.

A common techniques for converting some of these extracts from their liquid form into dry powdered products involves dehydration by boiling, which results in a dry, crystalline sugar rich product. However, this boiling process leads to removal or destruction of components in these extracts that have been found to have positive health benefits when consumed.

In an attempt to maintain health promoting compounds when drying, attempts have been made to spray dry high sugar, low $T_g$ extracts using conventional spray dryers known in the art. These conventional techniques involve heating a liquid extract to a temperature at which water in the liquid is converted to steam when it is sprayed into the dryer. Not only is this heating detrimental to the end product, but it also causes problems in the dryer due to the high sugar concentration and low $T_g$ of product being dried. The temperature in conventional dryers is so high that sugar crystals form on the dryer walls due to their high temperature. This has led manufacturers to add high $T_g$ sugars, such as lactose or maltodextrin, to the liquid extract before drying in order to raise the overall $T_g$ of the mixture to the point at which it can be dried successfully without melting on impact with the spray dryer walls. The amount of maltodextrin required to achieve drying of a mixture can exceed 50% of the final product. In addition, the final powdered product can only be dried to around 50% total solids using such processes.

There is a need for a cost effective method for the production of a powdered product with high total solids from a high sugar content, low $T_g$ liquid extract, the end product maintaining some or all of the health promoting components found in its original liquid form.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

SUMMARY

According to an aspect of the disclosure, there is provided a method of production of a homogeneous powdered product from a starting product in a liquid state, the starting product having sugars as at least 60% of its total solids, the method comprising: in the absence of air: pressurizing the starting product to a pressure greater than 1 bar; injecting a gas into the starting product to form a mixture in which the starting product is substantially saturated by the gas; and degassing the mixture into a continuous stream of transport gas such that, on contact with the transport gas, water from the mixture evaporates to leave the homogeneous powdered product. In some embodiments, in order to achieve substantial saturation, the rate of injection of gas by volume based on the dry mass of the starting product may be greater than 10 normal litres per kilogram per minute ($nl \cdot kg^{-1} \cdot mn^{-1}$), the volume of gas being expressed under normal temperature and pressure conditions.

According to another aspect of the disclosure, there is provided a method of production of a homogeneous powdered product from a starting product in a liquid state, the sugar cane extract having a viscosity greater than 300 centipoise and having sugars as at least 85% of its total solids, the method comprising: in the absence of air: pressurizing the sugar cane extract to a pressure greater than 4 bar; injecting carbon dioxide into the starting product to form a mixture in which the starting product is substantially saturated by the carbon dioxide so as to form a solution comprising carbonic acid and the starting product; and degassing the mixture into a continuous stream of transport gas such that, on contact with the transport gas, water from the mixture evaporates to leave the homogeneous powdered product. The rate of injection of carbon dioxide by volume based on the dry mass of the starting product is prefereably greater than 10 $nl \cdot kg^{-1} \cdot mn^{-1}$, the volume of gas being expressed under normal temperature and pressure conditions.

According to another aspect of the disclosure, there is provided an apparatus for the production of a homogeneous powdered product from a starting product in a liquid state, the starting product having sugars as at least 60% of its total solids, the apparatus comprising: a thermomechanical treatment device configured to mix a gas with the starting product to form a mixture in which the starting product is substantially saturated by the gas; and a degassing device configured to degas the mixture into a continuous stream of transport gas such that, on contact with the transport gas, water from the mixture evaporates to leave the homogeneous powdered product. The rate of injection of gas by volume based on the dry mass of the starting product is preferably greater than 10 $nl \cdot kg^{-1} \cdot mn^{-1}$, the volume of gas being expressed under normal temperature and pressure conditions.

According to another aspect of the disclosure, there is provided a method of production of a homogeneous powdered product from a starting product in a liquid state, the starting product having sugars as at least 60% of its total solids, the method comprising: in the absence of air: pressurizing the starting product to a pressure greater than 1 bar; injecting a gas into the starting product to form a mixture comprising carbon dioxide in a quantity in excess of 35 grams per 100 grams of water in the starting product; and degassing the mixture into a continuous stream of transport gas such that, on contact with the transport gas, water from the mixture evaporates to leave the homogeneous powdered product.

According to another aspect of the disclosure, there is provided an apparatus for the production of a homogeneous powdered product from a starting product in a liquid state, the starting product having sugars as at least 60% of its total solids, the apparatus comprising: a mixing device configured to mix a gas with the starting product to form a mixture comprising carbon dioxide in a quantity in excess of 35 grams per 100 grams of water in the starting product, the starting product is substantially saturated by the gas; and a degassing device configured to degas the mixture into a continuous stream of transport gas such that, on contact with the transport gas, water from the mixture evaporates to leave the homogeneous powdered product.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DESCRIPTION OF EMBODIMENTS

Embodiments of the present disclosure relate to methods for the continuous production of a powdered product from a sugar rich product in liquid form. In particular, the methods described herein relate predominantly to the production of dry powdered products from aqueous solutions having more than 90% of their total solids (TS) made up of sugars and having a glass-liquid transition ($T_g$) less than 60° C. Examples of naturally occurring products having the above properties include but are not limited to sugar cane extract (juice and syrup), honey, fruit extracts (e.g. such as mango, pineapple, and banana juice and concentrate), vegetable extracts (juice and concentrate) and natural and artificial sweeteners.

Particular embodiments of the present disclosure will be described with reference to a generic sugar based product. It will be appreciated, however, that methods described herein may be used to produce a dry powdered product from many natural and artificial aqueous products having high sugar content and low $T_g$, such as those listed above.

Figure 1:
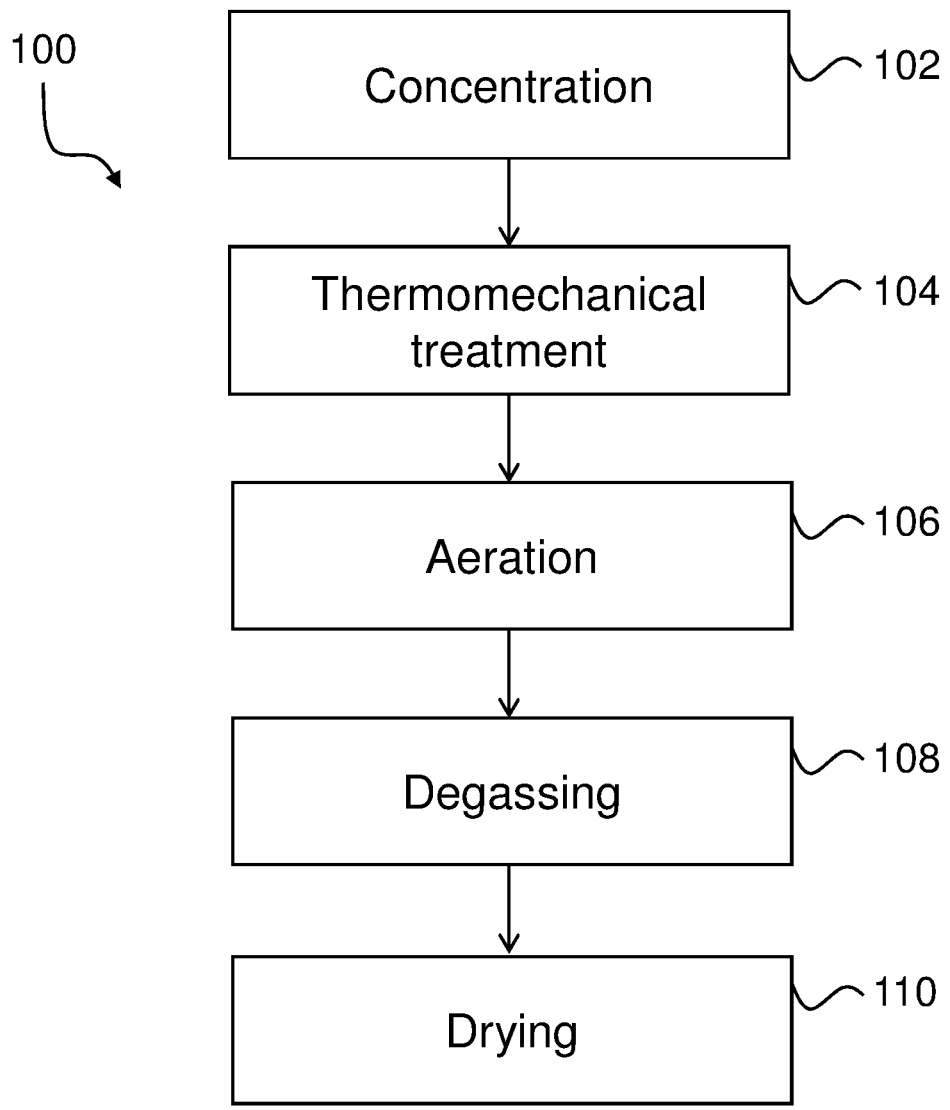
FIG. 1 is a flow diagram of depicting a method of drying a sugar based product according to an embodiment of the present disclosure.
Figure 2:
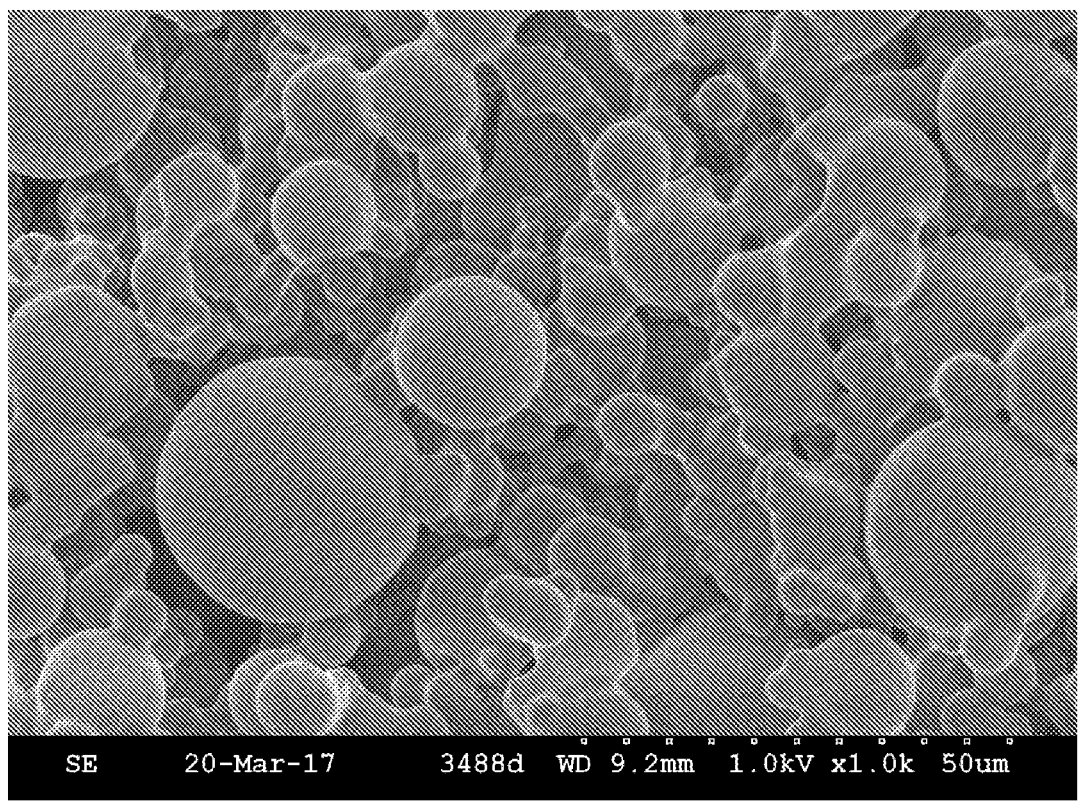
FIG. 2 is an image taken by a scanning electron microscope showing a product formed using a method according to an embodiment of the disclosure.
Figure 3:
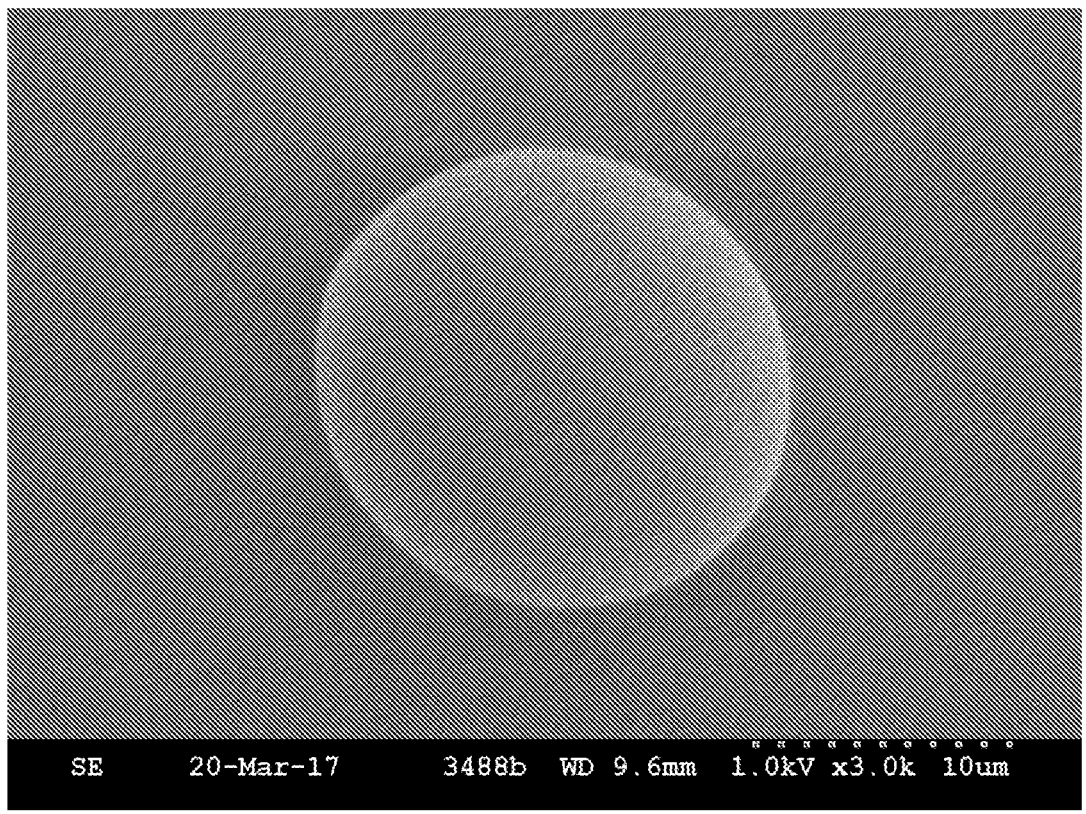
FIG. 3 is an image taken by a scanning electron microscope showing a product formed using a method according to an embodiment of the disclosure.

Methods described herein with reference to FIGS. 1 to 3 allow for the continuous production of a powdered product from a product in the liquid state. During a first step, a sugar rich product in its liquid form is transformed into a viscous state, for example by evaporation. The sugar rich product in its viscous state then undergoes a drying step which includes thermomechanical treatment and aeration.

FIG. 1 is a flow diagram 100 depicting a process for converting a sugar rich product in a liquid state into a sugar rich product in a powdered form. In a first concentration step 102, the sugar rich product in the liquid state, typically having a brix concentration of between 8° Bx and 30° Bx, is treated to obtain a sugar rich product in a viscous state having a brix concentration of over 50° Bx and preferably between 70° Bx and 80° Bx. The temperature for evaporation is chosen so as limit damage to the liquid product whilst still achieving the required evaporation. In examples, the evaporator may operates at between 40 and 45° C., between 45 and 50° C., between 55 and 60° C., between 60 and 65° C., or between 65 and 70° C. To reduce the temperature of evaporation of water during evaporation, evaporation may be performed under vacuum.

In some embodiments, an evaporator, such as a falling film evaporator (and preferably a multi-effect falling film evaporator) may be used. In which case, there may be a temperature gradient over the effects of the evaporator. For example, a three effect falling film evaporator might operate at a temperature of around 70° C. in its first effect, around 60° C. in its second effect, and around 50° C. in its third effect.

In some embodiments, vapour captured from the evaporator may be used in the production of an essence from the sugar rich product. Alternatively or additionally, vapour may be captured from the evaporator and mixed with the viscous sugar rich syrup in a later production step, as will be described in more detail below.

In other embodiments, the sugar rich product may be concentrated using techniques other than evaporation. For example, the sugar rich product may be concentrated using a membrane technology as is known in the art.

The concentrated (viscous) sugar rich product can then be subjected to at least one thermomechanical treatment step 104 to obtain a mixture of the concentrated sugar rich product and a gas such as carbon dioxide. The thermomechanical treatment step is preferably carried out in a thermomechanical treatment device, such as an extruder. The extruder may comprise two or more co-rotating, co-penetrating screws as is known in the art. Other examples of thermomechanical treatment devices include mixers such as paddle mixers or screw mixers, as well as blenders, kneaders and pumps.

The thermomechanical treatment device comprises a zone for simultaneous introduction, on the one hand, of the sugar rich product in a viscous state originating from the evaporation (or other concentration) step as described above and, on the other hand, a predetermined proportion of carbon dioxide and/or a predetermined proportion of liquid or powdered additives such as liquid extract aromas and other ingredients. Other ingredients may include powdered milk, vitamins, minerals and other additives.

In addition to the above, the vapours captured in the evaporator may be mixed with the sugar rich product at this point to capture volatile aromas otherwise lost during evaporation. It will be appreciated that any additive mixed with the sugar rich product should be able to withstand the pH and concentration of the sugar rich product.

The use of the extruder as a thermomechanical treatment device enables continuous treatment of injected sugar rich product. Thermal mechanical plasticisation/mixing may be carried out on the viscous sugar rich product, which in turn allows for, the mixing, blending, shearing and cooling (all at controlled pressure and temperature) of the viscous sugar rich product with carbon dioxide and/or any other additive described above.

In some embodiments, the thermomechanical treatment step is performed under pressure in excess of 5 bar and preferably no more than 15 bar. However, the pressure at which the thermomechanical treatment step is performed is dependent on several equipment parameters, including but not limited to pipe length, nozzle back pressures, etc.

The thermomechanical step is preferably performed at a low temperature, for example, less than 30° C. or more preferably below 15° C. Decreasing the temperature of the sugar rich product increases the amount of and speed at which carbon dioxide can dissolve into the aqueous sugar rich product. Injection of carbon dioxide at this stage also decreases the viscosity of the sugar rich product so that the solution can more easily exit the thermomechanical treatment device. On the other hand, decreasing the temperature also increases the viscosity of the sugar rich product. Accordingly, preferably, the temperature is not lowered below 5° C.

The resulting product of the thermomechanical treatment step 104 is a viscous sugar rich product having a brix concentration of between 60° Bx and 90° Bx.

This viscous sugar rich product can be transferred directly and continuously, without being exposed to the atmosphere, to an aeration device where it is aerated at step 106. The aeration device may comprise a device comprising a plurality of agitator blades configured to cut the sugar rich product with carbon dioxide to form the foam. Alternatively, a helical mixer may be used to introduce the sugar cane product to the carbon dioxide (or other gas at atmospheric conditions).

During the aeration step 106 the sugar rich product is mixed with a high volume of carbon dioxide (or other gas at atmospheric conditions) at an amount sufficient to substantially saturate the sugar rich product so as to form a solution comprising carbonic acid and at least some of the sugar rich product. To achieve saturation using carbon dioxide, the amount of carbon dioxide injected during the thermoelectric treatment step 104 and the aeration step 106, is preferably greater than 10 $nl \cdot kg^{-1} \cdot mn^{-1}$ of gas being expressed under normal temperature and pressure conditions based on the dry mass the sugar cane product input at the thermomechanical treatment step. In some embodiments, the amount of carbon dioxide injected is greater than 20 $nl \cdot kg^{-1} \cdot mn^{-1}$, or greater than 25 $nl \cdot kg^{-1} \cdot mn^{-1}$ or greater than 30 $nl \cdot kg^{-1} \cdot mn^{-1}$, or greater than 35 $nl \cdot kg^{-1} \cdot mn^{-1}$, or greater than 40 $nl \cdot kg^{-1} \cdot mn^{-1}$, or greater than 45 $nl \cdot kg^{-1} \cdot mn^{-1}$, or greater than 50 $nl \cdot kg^{-1} \cdot mn^{-1}$. In some embodiments, the amount of carbon dioxide injected is greater than 35 g per 100 g of water present in the viscous sugar rich product is used. The amount of carbon dioxide (or other gas at atmospheric conditions) required to achieve saturation will depend on the amount of water in the viscous sugar rich product and the temperature and pressure in the thermomechanical treatment device. In some embodiments, during injection of the carbon dioxide at any of the amounts of levels described above, the sugar rich product is held at a temperature of 30 degrees or lower, preferably 15 degrees C. or lower. In some embodiments, during injection of the carbon dioxide at any of the amounts of levels described above, the sugar rich product is held a at a pressure of 5 bar or greater.

Subsequent to the aeration step 106, a degassing step 108 is carried out. During the degassing step 108, the aerated sugar rich product is submitted to a sudden drop in pressure. This drop in pressure causes the separation of carbonic acid into carbon dioxide and water and the near instantaneous evaporation of the water contained therein, leaving behind a powdered sugar rich product consisting of homogenous solid particles of the sugar rich product.

The pressure may be reduced to atmospheric pressure or to a vacuum in order to achieve the requisite degassing.

Simultaneous to or shortly after the degassing step 108, the sugar rich product may be dried at step 110. In some embodiments, the aerated sugar rich product may be output from the aeration device via one or more nozzles into a stream of transport gas. The transport gas may be selected from one or more of air, oxygen, or carbon dioxide, and is preferably at a temperature greater than 50° C.

The transport gas is configured to transport the aerated sugar rich product into a drying device. The drying device may be in the form of one or more of a fluidized-bed dryer, an atomizing tower, a counter-current vertical dryer, and a conveyer dryer.

In some embodiments, after drying, the sugar cane product has a concentration of dry matter in excess of 96% and preferably 98% or more.

Whilst it is preferable to add carbon dioxide (or other gas at atmospheric pressure) during the thermomechanical treatment step 104 as described above, in some embodiments, carbon dioxide may only be added during the aeration step 106. In other embodiments, all of the carbon dioxide may be injected during the thermomechanical treatment step 104. The carbon dioxide may be introduced at any stage as a solid, liquid or gas under pressure, so long as the sugar rich product is aerated to the point at which the product is saturated by the gas as described above.

Whilst in embodiments described above, the sugar rich product is mixed with carbon dioxide, in other embodiments, other gases having similar characteristics to carbon dioxide may be used in addition to or in place of carbon dioxide. Such gases preferably exhibit good solubility in water. Further, such solubility is preferably improved with reduced temperature so that the sugar rich product can be maintained at a low temperature during the thermomechanical treatment step 104 and/or the aeration step 106. An example of a gas exhibiting these characteristics is nitrous oxide. Another example is butanol, although butanol is not suitable for use in the production of food grade products. Other examples include argon, ethylene, ethane, carbon monoxide, hydrogen, helium, and nitrogen. Two or more of these gases may be used in combination in the processes described herein.

Where nitrous oxide is mixed with the sugar rich product, amounts in the excess of 55 ml per 100 ml of water are preferably used in order to achieve saturation.

It will be appreciated that different sugar rich products may have different glass transition temperatures due to the different sugars contained therein. For example, the sugar contained in sugar cane extract (juice or concentrate) is approximately 95% sucrose, which has a $T_g$ of around 54° C. In contrast, the sugars in fruit juices tend to consist of more than 50% fructose, which has a lower $T_g$ of approximately 26° C. Other sugars such as maltodextrin and lactose, which are often added to sugar rich products to increase the glass transition temperature, have a $T_g$ In the region of 100° C.

Because of this, the Tg of a sugar rich product affects its behaviour when being dried. For example, sugar cane syrup, which has a relatively high glass transition can be injected into the dryer at relatively high percentage total solids (>70%) without the risk of the sugar cane juice sticking to the walls of the dryer.

In contrast, honey and fruit based sugar products with high levels of fructose, and thus a relatively low Tg compared with that of sugar cane syrup, may crystalize on the walls of the dryer as they are heated by the transport gas and drying gas circulating the dryer. Accordingly, preferably when processing sugar rich products containing a large amounts of low $T_g$ sugars, such as fructose, the walls and other surfaces of the dryer may be cooled, for example, using a cooling jacket. The surfaces of the dryer should not be cooled excessively, however, as such cooling may cause any gaseous water present in the dryer to condense on the walls. Condensate on the walls of the dryer may itself lead to sugar particles crystallising on the walls of the dryer.

To this end, it is also preferable to maintain the relative humidity within the dryer as low as possible to maximise the percentage total solids of the final powdered product. Preferably the relative humidity of the exhaust from the dryer is maintained below 12%. This may be achieved by ensuring that gas entering the dryer has a water content of less than 3 $g/m^3$ of gas entering the dryer. In some geographic locations, ambient air may exhibit these characteristics. However, in other jurisdictions, a desiccant may be provided at the gas (e.g. air) input of the dryer so as remove water from the gas as it enters the dryer.

EXAMPLES

In the following examples, a homogeneous sugar rich product was formed from a sugar cane product extracted from sugar cane using the method described in Australian provisional patent application number 2017901576 and International patent application number PCT/AU2018/050338, the contents of each of which are hereby incorporated by reference in their entirety.

Concentrated Sugar Cane Juice (Version 1)

In the following example, a viscous sugar cane solution having a specific gravity of 1.4 after concentration at step 102 and before thermomechanical treatment at step 104 was aerated with carbon dioxide such that after aeration at step 106, its specific gravity was reduced to below 0.4. The specifics of processing of the sugar cane solution are as follows.
Starting product:
  Total Solids (TS) 70%
  Specific gravity: 0.4
Amount of gas injected:
  greater than 10 nl·kg−1·mn−1 of carbon dioxide being expressed under normal temperature and pressure conditions and based on the dry mass of starting product input at the thermomechanical treatment step.
Thermomechanical processing:
  pressure greater than 5 bar;
  optional mixing with vitamins/minerals;
  injection of carbon dioxide;
  temperature of the product: below 15° C.
Aeration:
  injection of carbon dioxide;
  temperature of the product: below 15° C.
Degassing:
  nozzle pressure: >4 bar;
  inlet of dryer: >80° C.
Resulting product (as shown in FIGS. 2 and 3):
  homogeneous;
  smaller than 50 μm;
  concentration of dry matter greater than 96%.

Using a scanning electron microscope, the Applicant took measurements of the resulting powdered sugar cane product in order to determine the characteristics of the internal structure obtained by the method described above. Images acquired by the scanning electron microscope are shown in FIGS. 2 and 3 at 50 μm and 10 μm respectively. It can be seen that the powdered product has a solid internal structure comprising substantially homogeneous balls. This is shown more clearly in FIG. 3 which depicts a single particle of the sugar cane product. The resulting product shows extremely limited porosity and further demonstrates that each particle is made up of solid sugar components.

The final product had a water activity of 0.11 at the output of the drying step 110.

Concentrated Sugar Cane Juice (Version 2)

In the following example, a viscous sugar cane solution having a specific gravity of 1.4 after concentration at step 102 and before thermomechanical treatment at step 104 was aerated with carbon dioxide such that after aeration at step 106, its specific gravity was reduced to below 0.5. The specifics of processing of the sugar cane solution are as follows.
Starting product:
  Total Solids (TS) 70%
  Specific gravity: 0.5
Amount of gas injected:
  greater than 10 nl·kg−1·mn−1 of carbon dioxide being expressed under normal temperature and pressure conditions and based on the dry mass of starting product input at the thermomechanical treatment step.
Thermomechanical processing:
  pressure greater than 5 bar;
  optional mixing with vitamins/minerals;
  injection of carbon dioxide;
  temperature of the product: below 15° C.
Aeration:
  injection of carbon dioxide;
  temperature of the product: below 15° C.
Degassing:
  nozzle pressure: >4 bar;
  inlet of dryer: >80° C.
Resulting product (as shown in FIGS. 2 and 3):
  homogeneous;
  smaller than 50 μm;
  concentration of dry matter greater than 96%.

The water activity of the powdered sugar cane product output from the dryer was found to be at approximately 0.3.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method of production of a homogeneous powdered product from a water containing sugar-rich product in a liquid state, the sugar-rich product having sugars as at least 60% of its total solids, the method comprising:
  pressurizing the sugar-rich product to a pressure greater than 1 bar and less than 15 bar;
  in the absence of air, mixing the sugar-rich product with an aeration gas to form a mixture in which the sugar-rich product is substantially saturated by the aeration gas;
  degassing the mixture into a continuous stream of transport gas at a temperature of 50° C. or greater such that, on contact with the transport gas, water from the mixture evaporates to leave the homogeneous powdered product; and wherein the aeration gas comprises at least one of:
  carbon dioxide; or nitrous oxide, or a mixture thereof, in a quantity sufficient to form a mixture comprising carbonic acid and/or nitric acid, and wherein during the mixing of the aeration gas and the sugar-rich product, the sugar-rich product is held at a temperature of 30° C. or lower.

2. The method of claim 1, wherein the amount of aeration gas mixed with the sugar-rich product by volume based on the dry mass of the sugar-rich product is between 10 normal litres·kg-1 ·mn-1 and 50 normal litres kg-1 ·mn-1.

3. The method of claim 2, wherein the sugar-rich product is concentrated sugar cane juice.

4. The method of claim 1, wherein, before or during the mixing of the aeration gas and the sugar-rich product, the sugar-rich product is cooled below 15° C.

5. The method of claim 1, wherein the transport gas comprises one or more of air, oxygen, and carbon dioxide.

6. The method of claim 5, further comprising:
   before or during the mixing of the aeration gas and the sugar-rich product, mixing the sugar-rich product with at least one additional product selected from the group consisting of powdered milk, vitamins, minerals, flavourings and aromas.

7. The method of claim 5, wherein the dry matter concentration of the homogeneous powdered product is greater than 96%.

8. The method of claim 1, wherein the mixture is degassed to atmospheric pressure or to a vacuum.

9. The method of claim 8, wherein the mixture is degassed into a drying device selected from the group consisting of a fluidized-bed dryer, an atomizing tower, a counter-current vertical dryer, and a conveyor dryer.

10. The method of claim 1, wherein:
   the sugar-rich product in a liquid state has a viscosity greater than 300 centipoise and has sugars as at least 85% of its total solids;
   the aeration gas is carbon dioxide; and
   the amount of carbon dioxide mixed with the sugar-rich product by volume based on the dry mass of the starting product is between 10 normal litres kg-1 ·mn-1 and 50 normal litres kg-1 ·mn-1.

* * * * *